United States Patent Office 3,321,291
Patented May 23, 1967

3,321,291
METHOD FOR THE CONTROL OF UNDESIRABLE PLANT GROWTH
Edward D. Weil, Lewiston, N.Y., assignor to Hooker Chemical Corporation, Niagara Falls, N.Y., a corporation of New York
No Drawing. Filed Aug. 2, 1965, Ser. No. 476,681
6 Claims. (Cl. 71—2.3)

This a continuation in part of my application Ser. No. 216,036, filed Aug. 10, 1962, now U.S. Patent 3,255,227.

This invention relates to novel chlorinated alicyclic alcohols and their esters, and in particular to the use of such compounds as pesticides.

The compositions of this invention can be represented by the following structure:

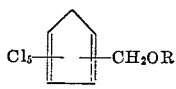

wherein R is selected from the group consisting of hydrogen and an acyl radical. The product is capable of existing in various isomeric forms with respect to location of the double bonds, and it is intended to encompass the isomer mixtures as well as the individual isomers.

The alcohols and esters of this invention have found utility as herbicides, germicides, insecticides and chemical intermediates. They are further useful as flame-retardant ingredients for resins and coatings.

The novel alcohol compositions of the instant invention are prepared by the vapor-phase reaction of hexachlorocyclopentadiene and methanol, at a temperature between about 350 degrees centigrade to about 600 degrees centigrade.

The method of preparing the alcohol composition of this invention employing methanol is illustrated by the following equation:

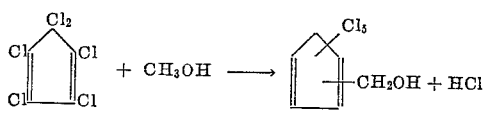

The hexachlorocyclopentadiene employed as a reactant in the above equation is a known compound which can be prepared from pentane, isopentane and mixed pentanes, for example, as described by Maude and Rosenberg, U.S. Patents 2,650,942 and 2,714,124.

In carrying out the process of the instant invention, a tubular reactor is preferred since this type of design involves a large heat transfer area, thus allowing the reactants to rapidly reach the desired reaction temperature and also assures maximum uniformity of retention time.

The reaction vessel or tube may be unpacked, but to facilitate heat transfer a packing may be used if desired. The reactor can be constructed from a variety of materials. However, the material of construction must be resistant to hydrogen chloride and to the haloorganic reactants and products at the reaction temperature. Illustrative examples of suitable materials include ceramics, graphite, glass, inert metals, various steels and the like.

The reaction is conveniently conducted by feeding hexachlorocyclopentadiene and methanol concurrently, either via separate feed lines or in admixture into a heated zone maintained at the reaction temperature. Feeding may be accomplished by gravity feed, mechanical pumps, or carburation into a carrier gas.

To facilitate a uniform reaction zone temperature, an evaporator-preheater zone may precede the reaction zone proper. After the desired retention time, which should be on the order of about 0.1 to about 60 seconds, the gaseous reaction mixture which leaves the reaction zone is cooled, for example by a condenser or by a quenching tower. In the latter apparatus, the reactor effluent may conveniently be quenched and cooled by contact with a cool stream of water, aqueous hydrochloric acid, methanol, or hexachlorocyclopentadiene.

The reactants may be fed in any ratio, although a large excess of one reactant is unnecessary. Economics, i.e., the relative costs of the two reactants, will generally influence the choice of the ratio to be employed. When hexachlorocyclopentadiene is the more costly reagent, the methanol may be fed in molar excess to facilitate a higher conversion of hexachlorocyclopentadiene, at the expense of a lower conversion of methanol, and conversely when the methanol cost is the determining factor.

Further reaction of the product, however, with either of the two reactants may occur, especially toward the outlet end of the reactor; for this reason, it has been found preferable to operate the process at low levels of conversion, a few percent up to 75 percent preferably, and to separate the unreacted starting materials from the product. These unreacted starting materials may be recovered and, if desired, may then be recycled to the reactor. The separation and recycling may be performed batch-wise or continuously.

It is convenient to condense the entire effluent from the reactor, excepting part of the hydrogen chloride, by passing the effluent through a condenser cooled below the condensation point of the methanol, then to fractionally distill the condensate in a continuous or batch still to separate the unreacting starting materials from the product. Alternately, the effluent from the reactor may be fed directly to a condenser or stripping column wherein the separation of the product (which is higher boiling than either reactant) from the unreacted starting material is performed. The unreacted starting materials being uncondensed as they leave such a condenser or stripping column, may be partially or completely separated from the hydrogen chloride by a second partial condenser, stripping column, or scrubbing column, and the unreacting starting materials then recycled.

Pressure is conveniently atmospheric or close to atmospheric, although the process is workable at subatmospheric or superatmospheric pressures. To effect higher conversions at any given temperature, superatmospheric pressure is employed. Further, inert diluent gases such as nitrogen, hydrogen chloride or carbon dioxide may be utilized as a convenient artifice to feed the reactants by evaporation into a carrier gas.

While no catalyst is required, it has been found that increases in conversion under given conditions of temperature and retention time can be obtained by the use of surface active solid reactor packings, actinic light, or traces of substances capable of initiating gas phase free-radical chain reactions, e.g. oxygen, chlorine and the like.

The esters of the alcohols of the instant invention may be prepared by any of the methods known to the art for converting alcohols to esters, as, e.g., direct esterification of the alcohol with the free acid to which the acyl radical is to be introduced, or reaction of the alcohol with the acid chloride or anhydride of the acid. If desired, a catalyst, such as a strong acid, in the case of direct esterification or a base in the case of use of the acid chloride or anhydride, may be used.

Thus may be produced, for example, alkanoates, such as the formate, acetate, propionate, butyrate, isobutyrate, laurate, octanoate, stearate; alkenoates, such as acrylate, methacrylate, crotonate; alkynoates, such as propiolate; haloalkanoates, such as chloroacetate, dichloroacetate, trichloroacetate, dichloropropionate, bromoacetate; phenylacetate; benzoate; halobenzoates, such as chlorobenzoate; toluate; phthalate (mono or diester); isophthalate; terephthalate; saturated aliphatic dibasic acid esters, such as oxalate, succinate, adipate, sebacate; unsaturated aliphatic dibasic acid esters, such as maleate, fumarate; tartrates; furoates; nicotinate; aryloxyalkanoates, such as phenoxyacetate; haloaryloxyalkanoates, such as 2,4-dichlorophenoxy-acetate; nitrobenzoates; sulfite; sulfate (mono or bis); arylsulfonates, such as benzenesulfonate; phosphates (mono-, di-, or triesterified); phosphorodithiolates; phosphites (mono-, di-, or triesterified); O,O-dialkylphosphate; O,O-dialkylthiophosphates; xanthate; carbamate; N-alkylcarbamates; N,N-dialkylcarbamates; N-arylcarbamates, such as N-phenylcarbamate; halogenated N-arylcarbamates, such as N-chlorophenylcarbamate; N,N-dialkylthiocarbamates; borates, titanates, and antimonates of pentachlorocyclopentadienylcarbinol. Of the O,O-dialkylphosphates, O,O-dialkylthiophosphates, N-alkyl carbamates, N,N-dialkyl carbamates and N,N-dialkylthiocarbamates, the species having lower alkyl groups, i.e., one to six carbon atoms, are preferred because of their generally greater pesticidal activity. It is within ordinary skill in the art to make any ester of the novel alcohols disclosed, although the carbon chain length of the organic groups will generally not exceed about 20 carbon atoms.

Pentachlorocyclopentadienylcarbinol upon reaction with phosphorus chlorides, thionyl chloride (in presence of base catalyst) or with hydrogen chloride (in presence of Lewis acid catalysts or pressure) also can yield the hitherto inaccessible pentachlorocyclopentadienylcarbinyl chloride, which is an active insecticide, soil fumigant, and useful chemical intermediate. Furthermore, pentachlorocyclopentadienylcarbinol upon oxidation with oxidizing agents such as nitric acid, permanganates, chlorine, manganese dioxide and the like, can yield the hitherto inaccessible pentachlorocyclopentadiencarboxylic acid, its aldehydes or esters, these being potent herbicides.

The following specific examples further illustrate the invention; however, this detailed disclosure is not to be construed as limiting the scope of the present invention.

*Example 1.—Preparation of pentachlorocyclopentadienylcarbinol*

A mixture of one part by volume of hexachlorocyclopentadiene and four parts by volume of methanol is fed continuously at the rate of 115 cc. per hour into a vertical unpacked Vycor glass tube (150 cc. inner volume) maintained at 410 to 430 degrees centigrade by an electric furnace. The effluent gases leaving the reactor are condensed by passage through a water-jacketed condenser, and are collected in a water-cooled receiver. Titration of a small aliquot of the receiver contents showed that nearly one mole of hydrogen chloride was evolved per mole of hexachlorocyclopentadiene fed.

The product is distilled at atmospheric pressure to remove unreacted methanol (which was recycled) and then distilled under reduced pressure, collecting the fraction B.P. 80–110 degrees centigrade (0.04–0.05 mm.) as the desired product. The product is a pale yellowish wax.

The product is recrystallized from heptane to obtain a colorless crystalline solid, M.P. 60–1 degrees centigrade. The infrared spectrum showed band characteristic of the —OH group.

*Analysis.*—Calcd. for $C_6H_3Cl_5O$: Cl, 66.0%. Found: Cl, 66.1%.

*Example 2.—Preparation of pentachlorocyclopentadienylcarbinol*

Into a heated Vycor tube at 430 to 450 degrees centigrade, 748 grams of hexachlorocyclopentadiene and 461 grams of methanol are fed continuously and simultaneously by means of separate feeding pumps, over a period of 6 hours. The reactor effluent is condensed in a water cooled receiver. Titration of the condensate showed that 0.6 mole of hydrogen chloride was present. The condensate was distilled at atmospheric pressure to recover the unreacted methanol (450 grams). The remaining liquid in the still pot is fractionally distilled under vacuum to remove 673 grams of unreacted hexachlorocyclopentadiene. Then, a fraction was obtained boiling at 95 to 103 degrees centigrade (0.15 to 0.25 mm.), which solidified to a waxy solid; yield 40 grams. The infrared spectrum showed this fraction to be identical to the pentachlorocyclopentadienylcarbinol product of Example 1.

*Example 3.—Preparation of pentachlorocyclopentadienylcarbinol*

Into a Vycor tube (150 cc. volume) at 470 to 480 degrees centigrade is passed 1,012 grams of hexachlorocyclopentadiene and 511 grams of methanol over a period of 6 hours using separate feed pumps.

The product is distilled as in the preceding example to remove 1,300 grams of unreacted starting materials and then fractionally distilled, yielding as the principal product 72 grams of pentachlorocyclopentadienyl carbinol, B.P. 85 to 105 degrees centigrade (0.1 mm.) (identified by its infrared spectrum).

*Example 4.—Preparation of bis(pentachlorocyclopentadienylcarbinyl)sulfite*

5 grams of recrystallized pentachlorocyclopentadienylcarbinol and 15 grams of thionyl chloride are refluxed for 12 hours. The excess thionyl chloride is then distilled off by means of aspirator vacuum and the residue distilled under high vacuum, to obtain 3.5 grams of yellowish liquid, B.P. 107 to 108 degrees centigrade (0.30 mm.), which on standing several days solidified to a solid, M.P. 67 to 68.5 degrees centigrade. This was established to be bis(pentachlorocyclopentadienyl carbinyl) sulfite by elemental analysis and the infrared spectrum which showed a band at 1213 cm.$^{-1}$ characteristic of the —O—SO—O-grouping.

*Analysis.*—Calcd. for $C_{12}H_4Cl_{10}SO_3$: Cl, 60.7%; S, 5.5%. Found: Cl, 60.7%; S, 5.9%.

*Example 5.—Preparation of pentachlorocyclopentadienyl carbinyl acetate*

5.8 grams of pentachlorocyclopentadienyl carbinol and 10 ml. of acetyl chloride were refluxed for 3 hours, then vacuum-distilled to collect 5 grams of the acetate ester, a light yellow liquid, B.P. 95 to 96 degrees (0.5 mm.). The infrared spectrum indicates a typical ester carbonyl band at 5.68 microns.

*Analysis.*—Calcd. for $C_8H_5O_2Cl_5$: Cl, 57.2%. Found: Cl, 56.9%.

Other esters of pentachlorocyclopentadienylcarbinol were prepared as follows:

rates preferable in any given situation depending on weed species, stage of growth, vigor, degree of kill required, and other factors which will be obvious to those skilled in the art.

| Example | Reagents * | Conditions | Ester Obtained | Nature of Product |
|---|---|---|---|---|
| 6 | Benzoyl chloride (1 mole) | Reflux in benzene 24 hours | Benzoate | Yellowish wax. |
| 7 | Phthalate (1 mole) | Reflux in toluene 10 hours | Acid phthalate | Yellowish solid. |
| 8 | m-Chlorophenylisocyanate (1 mole) | Reflux in benzene 12 hours | m-Chlorophenyl carbamate. | Lt. yellowish wax. |
| 9 | O,O-dimethylchlorophosphate (1 mole) | Reflux in benzene contg. 1 mole triethylamine for 6 hrs. | O,O-dimethyl phosphate. | Reddish syrup. |
| 10 | O,O-diethyl chlorophosphate (1 mole) | do | O,O-diethyl phosphate. | Do. |
| 11 | N,N-diethylthiocarbamyl chloride (1 mole). | do | N,N-diethyl-thiocarbamate. | Do. |
| 12 | 96% Sulfuric Acid (excess) | Warm to dissolve | Acid Sulfate | Water-soluble oil. |

*Amount employed per mole of alcohol.

*Example 13.*—*Herbicidal use of pentachlorocyclopentadienylcarbinol*

Greenhouse flats planted with various representative weed species were sprayed post-emergence with an aqueous dispersion of pentachlorocyclopentadienyl carbinol at a rate corresponding to 8 pounds per acre. One week later, the herbicidal effect of the treatment was noted as follows:

Species: Effect
- Wild oat _____ 3
- Cheat grass _____ 3+
- Foxtail _____ 4
- Barnyard grass _____ 3+
- Crabgrass _____ 4
- Johnson grass _____ 4
- Yellow-rocket _____ 4
- Pigweed _____ 4
- Velvet leaf _____ 4
- Lambsquarters _____ 4
- Curled dock _____ 4

Scale:
- 0=no effect
- 1=slight damage
- 2=moderate damage
- 3=severe damage, plants will not recover
- 4=kill The esters of the above alcohol were also found generally phytotoxic. At 8 pounds per acre, 100% kill of emerged ragweed and pigweed was obtained by use of the benzoate, phthalate (mono), m-chlorophenylcarbamate, and N,N-diethylthiocarbamate of pentachlorocyclopentadienylcarbinol.

*Example 14*

The pentachlorocyclopentadienylcarbinol of Example 1 was added to nutrient agar at 0.025% concentration. The agar was then inoculated with *Staphylococcus aureus* and *Escherichia coli*. The growth of both bacterial species was found to be completely inhibited in the treated agar, whereas large colonies of both species developed in the same agar without the addition of the test chemical.

*Example 15.*—*Utility of various esters*

The sulfite, acetate, O,O-dimethylphosphate and O,O-diethylphosphate esters of Examples 4, 5, 9, and 10, were sprayed at 0.1% dispersions in water onto plants infested with Mexican bean beetle and with mites (*Tetranychus atlanticus*). Observed 24 hours later, essentially 100% kill of both species was obtained using each compound.

The herbicidal method of the invention comprises spraying the compounds of the invention, most conveniently as an emulsion in water by the aid of an organic solvent and emulsifier or as a solution in a mineral oil, onto the weed seedlings to be killed. Rates of one to fifty pounds of toxicant per acre are preferred the extract The compounds of the invention may be employed in combination with other herbicides and with fungicides, insecticides, growth stimulants, and fertilizers if desired. Their action may be enhanced by suitable choice of solvents, wetting agents, penetrating agents, spreaders, stickers and synergists. The use of the commercial spray additives known collectively as "spreader-stickers" is particularly to be recommended with these compounds.

Various changes and modifications may be made in the method and apparatus of this invention, certain preferred forms of which have been herein described, without departing from the spirit and scope of this invention.

The insecticidal method of the invention comprises spraying or otherwise distributing the esters of the invention, formulated as discussed above, or in the form of a dust or wettable powder or granular formulation on a solid carrier such as clay, onto the locus of the present or anticipated insect infestation. Rates of 0.25–5 pounds per acre are preferred.

I claim:

1. A method for the control of undesirable plant growth comprising contacting said plant with a herbicidally effective amount of a composition selected from the group consisting of

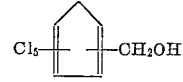

and herbicidal esters thereof of a carbon chain length of up to about 20 carbon atoms.

2. The method of claim 1 wherein the composition employed is pentachlorocyclopentadienylcarbinol.

3. The method of claim 1 wherein the composition employed is a chlorophenyl carbamate ester of pentachlorocyclopentadienylcarbinol.

4. The method of claim 1 wherein the composition employed is the benzoate ester of pentachlorocyclopentadienylcarbinol.

5. The method of claim 1 wherein the composition employed is the phthalate ester of pentachlorocyclopentadienylcarbinol.

6. The method of claim 1 wherein the composition employed is the N,N-diethylthiocarbamate ester of pentachlorocyclopentadienylcarbinol.

References Cited by the Examiner

UNITED STATES PATENTS

| | | | |
|---|---|---|---|
| 2,946,674 | 7/1960 | Rakoff | 71—2.3 |
| 3,088,817 | 5/1963 | Richter | 71—2.3 |
| 3,159,660 | 12/1964 | Closson et al. | 71—2.3 |

LEWIS GOTTS, *Primary Examiner.*

JAMES O. THOMAS, JR., *Examiner.*